Nov. 10, 1942.   W. UHL   2,301,482
WRITING MACHINE
Filed Jan. 8, 1941   6 Sheets—Sheet 1

INVENTOR.
William Uhl
BY Raymond L. Bohrer
his ATTORNEY.

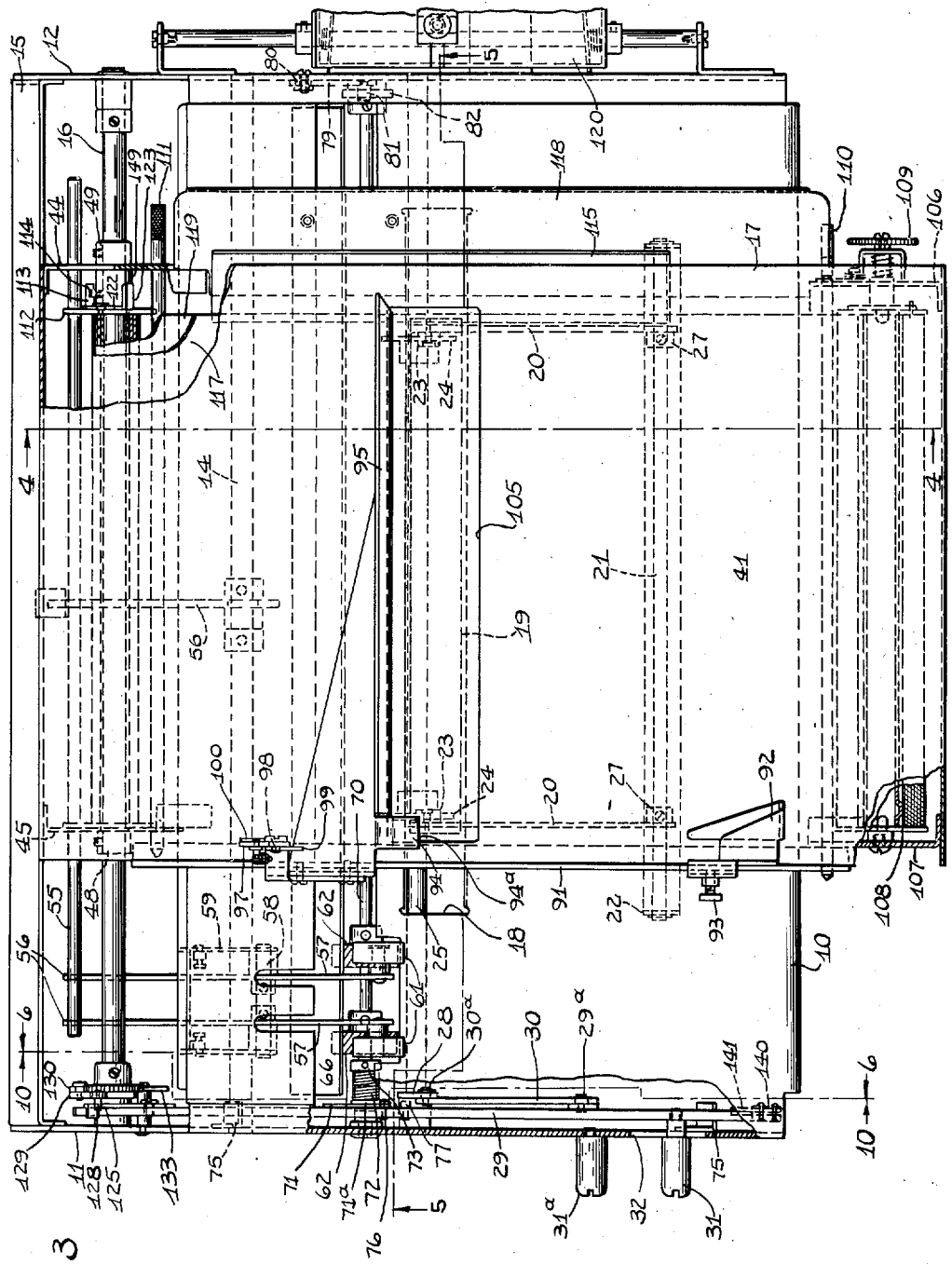

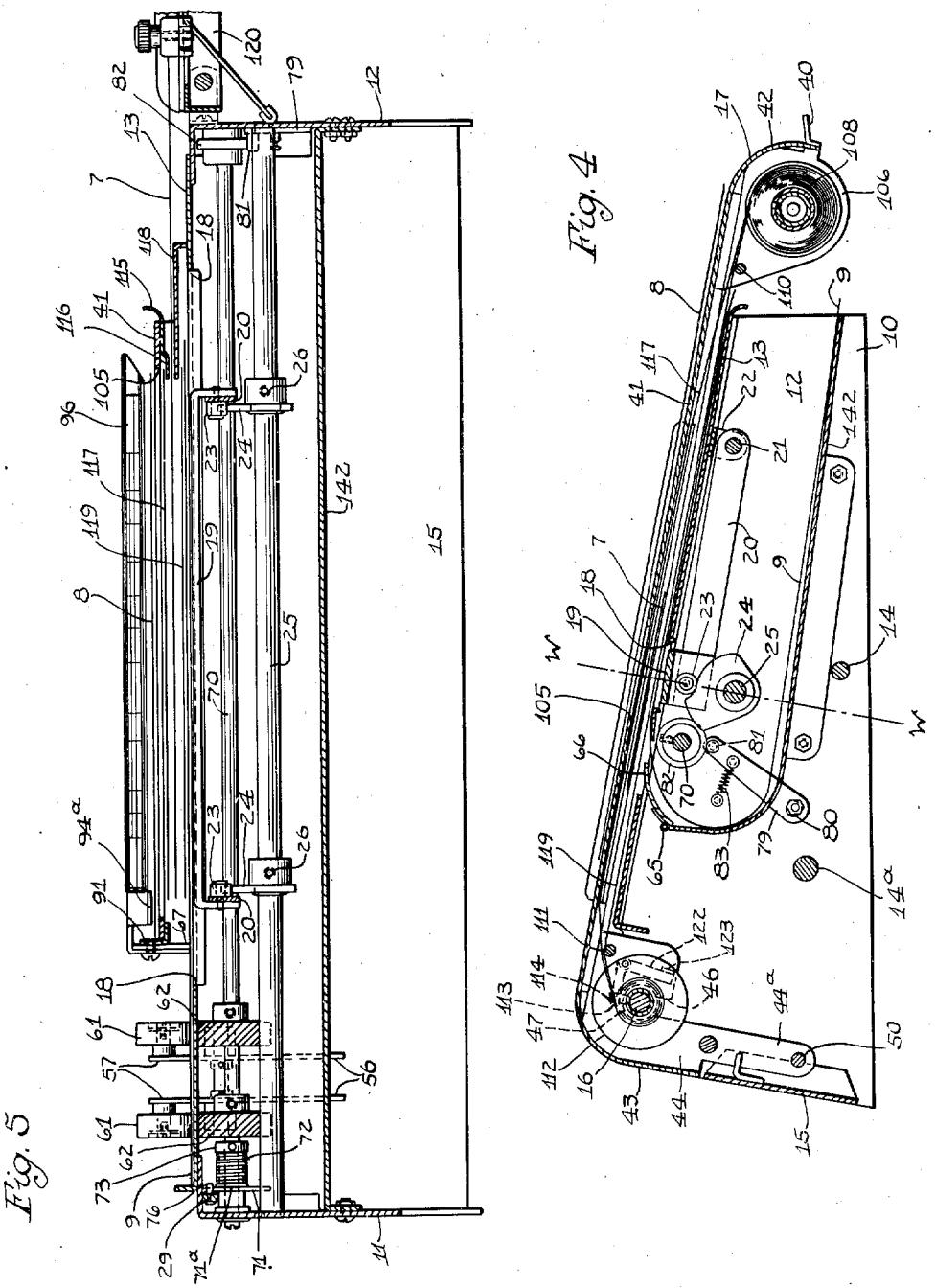

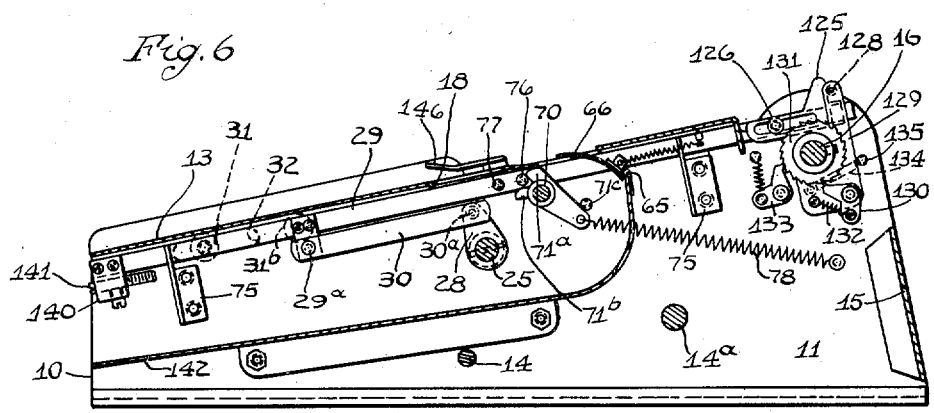

INVENTOR.
William Uhl
BY Raymond L. Bohrer
his ATTORNEY.

Nov. 10, 1942. W. UHL 2,301,482
WRITING MACHINE
Filed Jan. 8, 1941 6 Sheets-Sheet 6

INVENTOR.
William Uhl
Raymond L. Bohrer
BY
his ATTORNEY.

Patented Nov. 10, 1942

2,301,482

UNITED STATES PATENT OFFICE 2,301,482

WRITING MACHINE

William Uhl, Rochester, N. Y., assignor to The Todd Company, Inc., Rochester, N. Y., a corporation of New York Application January 8, 1941, Serial No. 373,637

15 Claims. (Cl. 282—5)

This invention relates to improvements in a writing machine such as an appliance adapted to receive and hold separate record sheets in manifolding relation, and by the use of which entries may be inscribed on the uppermost sheet and simultaneously transferred to the underlying record sheets at one writing. An important advantage of the machine is that provision is made to locate the entry portion of each record sheet at the writing line of the appliance. It is particularly useful in assembling a group of separate record sheets and handling bookkeeping operations essential in the manual posting of entries relative to payroll or other disbursements and accounts receivable, such as installment accounts of merchants, loan or finance institutions, and the like.

Another object is the provision of a writing machine arranged to receive certain record sheets positioned at the writing line of the appliance for a single line of entry, and another record sheet positioned and mechanically advanced with respect to the writing line for the reception of a number of successive entries, the arrangement being such as to further provide for readily adjusting the extent of each advance of the latter record sheet according to the requirements of any posting or bookkeeping operation.

To these and other ends the invention resides in certain improvements and combination of parts, all as will be hereinafter more fully described, the novel features being pointed out in the claims at the end of the specification.

In the drawings:

Fig. 3 is a plan view similar to Fig. 1, without the record sheets positioned on the device but with certain parts broken away to show some of the operating mechanism.

Fig. 4 is a longitudinal, vertical section taken substantially on the line 4—4 of Fig. 3, showing the writing platen lowered and the record sheets positioned in the device.

Fig. 5 is a transverse vertical section taken substantially on the line 5—5 of Fig. 3.

Fig. 6 is a longitudinal, vertical section on the line 6—6 of Fig. 3 showing the operating mechanism of the device in the normal or intermediate position.

Fig. 10 is a longitudinal, vertical section taken on the line 10—10 of Fig. 3, showing the head raised and the feed rollers separated to permit insertion and positioning of one of the record sheets in the device.

Fig. 11 is a fragmentary showing similar to Fig. 10 but disclosing the head lowered to writing position and the feed rollers in cooperating engagement.

Figs. 12, 13, and 14 are fragmentary views of certain types of record forms adapted to be used with and positioned on the device in manifolding relation for the reception of entries at the common writing line of the machine.

Figure 15:
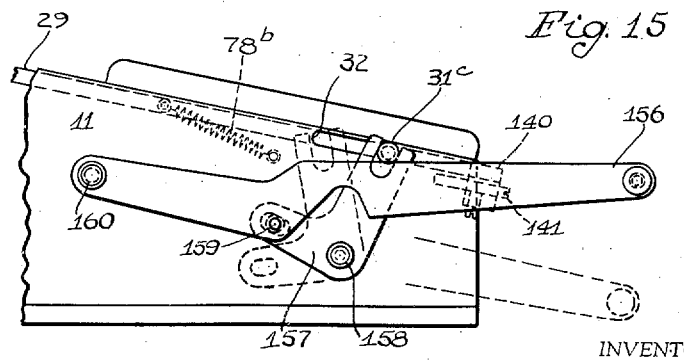

Fig. 15 is a fragmentary side elevational view showing a modified form of an actuator for the operating means.

The reference numerals throughout the several views indicate the same parts.

The invention comprehends a sheet writing or posting machine which is adapted for use in bookkeeping operations essential to disbursement and accounts receivable procedure. While the machine may be used for various types of bookkeeping operations it will be described, by way of example, in connection with a modern payroll disbursement procedure. In modern payroll practice it is essential to supply each employee with a record of period earnings and deductions, including deductions for Social Security, unemployment or group insurance, etc. While this information may be embodied in the body of a pay check or cash envelope, it is common practice to inscribe such data on a detachable stub portion of the check or envelope so that the record may be retained by the employee. A representation of a check having a removable stub portion provided with a voucher panel is shown by way of example in Fig. 14.

An individual earning record sheet is also used for the purpose of producing a record of each weekly transaction. An earnings record of this nature is shown in Fig. 13 of the drawings and is provided with weekly entry lines adapted to receive data corresponding to that inscribed on the check stub. A payroll or master record sheet, such as shown in Fig. 12 of the drawings, is also used in order to produce a payroll record for the employer. The payroll or journal sheet is provided with a series of entry lines each providing for an employee's name and the data corresponding to that inscribed on the other record sheets.

In the use of the present invention the payroll record sheet is positioned in the machine and adapted to receive a line of entry in each posting operation. The individual earnings record and check with the voucher stub are inserted in the device for a single line of entry relative to the individual employee. The forms are positioned in the machine in superimposed relation so that the inscription on the original or top form is transferred to the underlying record sheets.

Referring now to the drawings, the machine is provided with a casing generally designated by the reference numeral 10 adapted to receive the payroll record sheet 9. An adjustable and movable head or sheet holder generally designated by the numeral 17 is pivotally mounted to the base 10 and adapted to receive the individual earning record 8 and the check or record sheet 7. In this manner a plurality of independent record sheets are arranged in manifolding relation for the reception of writings entered upon the original or topmost sheet by a suitable writing instrument.

In the use of the device, the operator grasps the fingerpiece 40 provided at the front of the head 17 and raises the head from the position shown in Fig. 4 to that shown in Fig. 10. This displacement of the head 17 permits free access to the bed of the base 10 for positioning the payroll record sheet 9 thereon. The casing 10 includes the side frames 11 and 12 and the top plate or bed 13. The tie-rods 14 and 14a, together with the rear cross member 15, serve to retain the side frames in spaced relation. A cross shaft 16 having its ends mounted in the side frames adjustably supports the head, Figs. 1, 3, and 10 of the drawings. The head 17 pivotally supported on shaft 16 is shown in normal writing position in Fig. 4, but it is adapted to be raised to the position shown in Fig. 10, as previously mentioned.

The bed plate 13 serves as a support for the record sheet 9 and is provided with an opening 18 at the common writing line of the device generally denoted by the center line marked W—W, Fig. 4 of the drawings. A platen or support 19 is aranged at the writing line of the machine, and is adapted to be raised and lowered through the opening 18 at predetermined intervals in the operation of the device. The platen 19 is preferably a flat plate adapted when in its upper position to serve as a support or writing surface for the record sheets positioned in manifold relation. The downwardly formed ends of the platen member 19 are rigidly secured to one end of the links 20, Figs. 4 and 5. The opposite ends of the links 20 are adjustably supported by a rod 21 carried by bracket 22 mounted on the under side of the bed 13. A roller 23 carried by each side link 20 engages the platen positioning cam 24 adjustably secured to the rock shaft 25 by the set screws 26. The opening 18 is somewhat wider than the platen member 19 as shown in Fig. 5, and provides for shifting the platen 19 transversely in order to provide a writing surface at varying locations for different bookkeeping operations. Lock collars 27, arranged on rod 21 adjacent the links 20, normally hold the platen in a predetermined position, but the collars may be moved to correspondingly shift the platen. Therefore, the arrangement provides that the platen 19 and the operating cam 24 may be suitably shifted on their supports.

Figure 7:
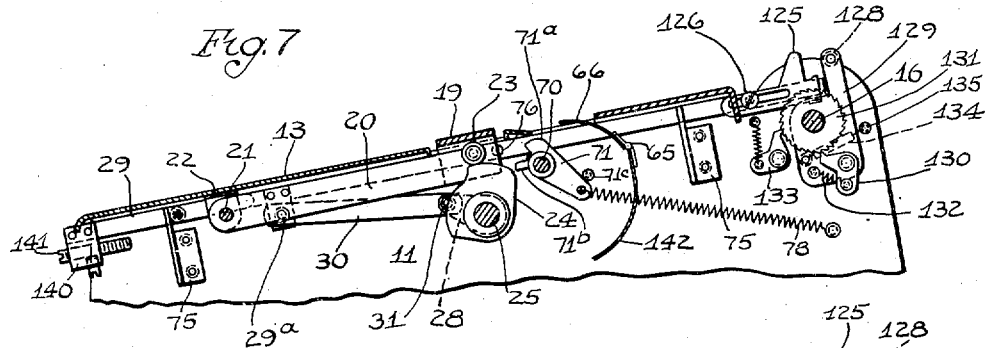
Fig. 7 is similar to Fig. 6 but showing the operating mechanism moved to the forward position effective to raise the platen to writing position.
Figure 8:
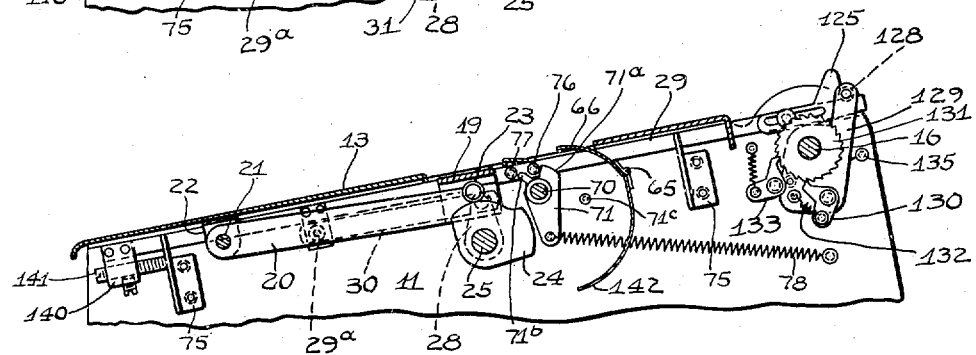
Fig. 8 is also similar to Fig. 6 but showing the operating mechanism moved to the rear position effective to actuate the feed roll means and the carbon web advancing means.

As viewed in Fig. 6, a rocker arm 28 pinned to the rock shaft 25 adjacent the side frames 11 is operatively connected to an actuating bar 29 by the link 30. The link 30 is connected at 30a to the rocker arm 28 and at its other end to the downwardly depending portion 29a of the bar 29. A knob 31 carried by the actuating bar 29 projects through an elongated slot 32 formed in the side frame 11 and provides for manually shifting the bar 29. In the preferred embodiment of the present invention, the actuating bar 29 normally rests in the normal or intermediate position as shown in Fig. 6 but is adapted to be shifted forward to the position shown in Fig. 7 in the initial operation of the device, for the purpose of raising the support or platen 19 to writing position. After the posting operation has been completed the bar 29 is then adapted to be shifted rearwardly to the position shown in Fig. 8 for the purpose of displacing or lowering the platen; to actuate the sheet feed mechanism; and to actuate the operating means for advancing the carbon or transfer webs in the manner hereinafter described.

When the actuating bar 29 is in its normal or intermediate position as shown in Fig. 6 the platen positioning cams 24 rest in the position shown in Fig. 4, that is, with the rollers 23 resting in the low part of the cams 24. In this position of the bar 29, the platen 19 rests below the surface of the bed plate 13 so as not to interfere with the insertion of the various record sheets. However, when the bar 29 is shifted to its forward position shown in Fig. 7, the link 30 causes the arm 28 to rock the shaft 25 so that the cams 24 are effective to raise the platen 19 to provide a rigid supporting surface at the writing line of the device.

Figure 1:
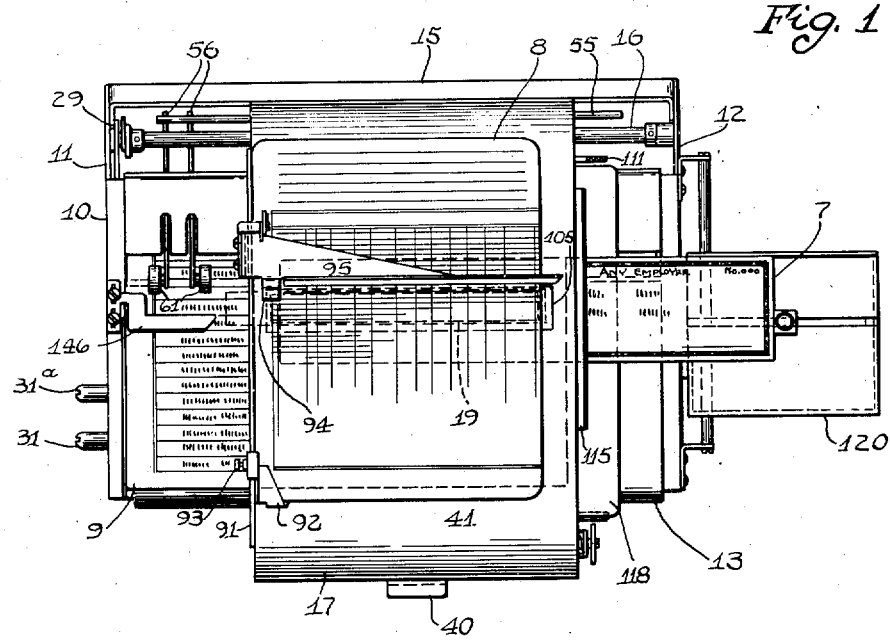
Fig. 1 is a plan view of the writing device showing several record sheets positioned thereon for the reception of the entries posted at the common writing line of the apparatus.

The head 17 includes a support or plate 41 that extends over the top of the bed 13 and is formed with depending portions 42 and 43, Figs. 1, 4, and 10. A pair of side supporting plates 44 and 45 are rigidly secured to each side of the top plate 41 adjacent the rear portion 43 thereof. Each plate 44 and 45 is provided with a slot 46 having one end terminating in the enlarged opening 47 adapted to receive the reduced hub of bushings 48 and 49 supported on shaft 16. These bushings are adapted to be inserted in the openings 47 and locked to shaft 16 by set screws so as to provide a pivotal mounting for the head 17. Upon loosening the set screws, the bushings and the head 17 may be adjusted transversely along shaft 16 corresponding to any adjustment desired and made with respect to the writing position of the platen 19. For assembly purposes, the slots 46 provide for the brackets 44 and 45 to be slipped in position over the shaft 16 prior to the placement of the bushings 48 and 49. Obviously, the head may be removed from the casting 11 by loosening and withdrawing the bushings from the supporting plates 44 and 45. The arrangement provides that the head 17 may be rocked about its supporting bushings to raise it to the position shown in Fig. 10.

Each supporting plate 45 and 46 is provided with an extending arm portion 44a and 45a, between which is mounted a cross rod 50. As shown in Fig. 11, the rod 50 is engaged by the end of a spring latch arm 51 under the tension of the spring 53. The latch arm 51 is mounted on one of the tie-rods 14a and is provided with a notch 52. Upon raising the head to the position shown in Fig. 10, the rod 50 rides along the surface of the arm 51 until it engages the notch 52 whereupon the tension of the spring 53 for the latch arm 51 tends to hold the head in the raised position.

A second cross rod 55 carried by the plates 44 and 45, has one end extending outward from plate 45, and is adapted upon the raising of the head to engage projecting fingers 56 of the feed roll arm 57 pivoted at 58 to the bracket 59 carried on the bottom of the bed plate 13, Figs. 10 and 11. A pair of upper feed rolls 61 are journaled on studs carried by arms 57, and are normally retained in engagement with the driven feed rollers 62 by the springs 60 connected to the arms 57. Therefore, it will be seen that upon raising the head as previously described, the rod 55 will rock the arms 57 to move them in a counterclockwise direction, Fig. 11, so as to raise the rollers 61 out of engagement with the rollers 62 as shown in Fig. 10.

A plate 66 adapted to serve as a sheet end guide and deflector is suitably pivoted at 65 to the sheet diverting member 142. A suitable spring is provided to rock the deflector 66 about its pivot so that it projects through the opening 18 and above the surface of the bed 13 when the head is raised. However, when the head is lowered to writing position, the deflector plate 66 is engaged by a projecting part 67 carried by the side flange 91 of the top plate 41. When the part 67 engages the plate 66 the latter is held in the position shown in Fig. 11 against the tension of its operating spring.

Figure 9:
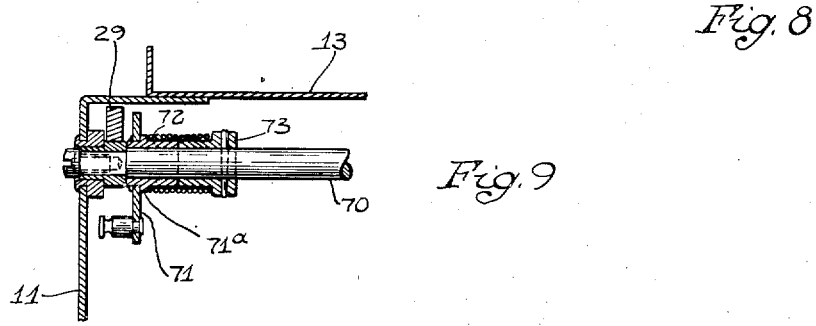
Fig. 9 is a detailed sectional view showing the spring clutch means capable of making a driving connection between the actuating means and the feed roller shaft.

The driven feed rollers 62 are rigidly mounted on the cross shaft 70 having its ends journaled in bearings supported by the side frames 11 and 12. A driver element 71 having a cylindrical hub 71a is loosely mounted on shaft 70 adjacent the side frame 11, Figs. 3, 6, and 9. Referring to Fig. 9 it will be seen that hub 71a is provided with a reduced shoulder that supports one end of a coil spring 72. A driven element 73 pinned to the rotatable shaft 70 is also provided with a reduced cylindrical portion mounted in juxtaposition with hub 71a and supports the other end of the coil spring 72. This arrangement provides for a spring clutch or drive connection between the driver member 71 and the driven member 73 fixed on shaft 70 for the purpose of intermittently rotating the shaft 70 and the feed rolls 62 in one direction. With this arrangement, when the driver 71 is rocked in a clockwise direction as viewed in Fig. 6, the cylindrical portion 71a through its gripping engagement with one end of the coil spring 72 tends to over-wind or reduce the diameter of the spring. This action of reducing the diameter of the spring 72 by the movement of the driver element 71 causes the opposite end of the spring to more firmly grip the cylindrical hub portion of the driven element 73 fixed to the shaft 70. The gripping action set up is effective to rotate the shaft 70 and the feed roller 62 at predetermined intervals in the actuation of the device. Obviously, as an alternative arrangement for a spring clutch mechanism, the element 73 may serve as the driver, and through the spring 72 actuate the element 71. Furthermore, the coils of the spring 72 may be wound on a cylindrical hub carried by one of the elements and on one end of the spring connected with the other element.

The actuating bar 29, which normally rests in the intermediate position shown in Fig. 6 is supported by brackets 75 mounted on the side frame 11. A pair of spaced pins 76 and 77 carried on the side of the bar 29 are effective to actuate the driver 71 when the bar is shifted rearward from the position shown in Fig. 6 to that shown in Fig. 8 in the operation of the device. However, the studs 76 and 77 are not effective to rock the driver 71 until the bar 29 is moved rearward beyond its so-called normal or intermediate position. A spring 78 tends to constantly rotate the driver 71 in a counterclockwise direction as shown in Fig. 6 until it strikes the stop pin 71c. Any retrograde movement of the driver 71 tends to unwind or enlarge the coils of the spring 72 and is ineffective to produce the gripping action by spring 72. Therefore, the feed rollers 62 are not rotated upon the return movement of the actuator 71 by the spring 78. This is due to the fact that the driver 71 in its return movement tends to open or loosen the coils of the spring 72 so that they do not grip both of the cylindrical hub portions of the driver element 71 and the driven element 73.

A retarding means including an arm 79 eliminates any tendency of the shaft 70 to rotate when the driver 71 is moved in a counterclockwise direction as viewed in Fig. 6. Referring to Figs. 3 and 4, the arm 79 is mounted for adjustment on an eccentric bushing 80 carried by the side frame 12. A roller 81 on the arm 79 is held in contact with a disc 82 pinned to the shaft 70 by a spring 83. The frictional engagement of the roller 81 permits rotation of the shaft 70 in a counterclockwise direction as viewed in Fig. 4 but prevents any retrograde movement of the shaft 70 and the feed rollers 62.

As previously described the initial step in preparing the device for use includes raising the head 17 to the position shown in Fig. 10. This operation is effective to release the deflector plate 66, and through the rod 55, is effective to separate the feed rollers 61. The machine is then ready and prepared for the reception and placement of the journal or payroll record sheet 9. As sheet 9 is placed on the bed 13, the end thereof will pass between the feed rollers 61 and 62. This record sheet is positioned to align the first item line with the writing line indicator 146 suitably secured to the casing 10. After the sheet 9 has been positioned on the bed plate 13, the head 17 is lowered, thereby permitting the cooperative engagement of the feed rollers 61 and 62 as the rod 55 moves away from the fingers 56 of the roller supporting arms 57. The device is then prepared for the placement of the other record sheets in the device that are essential to a predetermined posting operation.

The plate 41 of the head 17 is provided with an upwardly extending sheet guide flange 91 along the left side thereof, Figs. 3 and 5. A sheet end gauge 92 is slidably mounted on the flange 91 and adapted to be held in position by the thumb screw 93. The employee's record sheet 8 is placed upon the plate 41 with its side edge engaging the flange 91 and its lower left-hand corner in engagement with the gauge 92. The gauge 92 having been previously shifted to position the desired entry line with respect to a writing line indicator 94 formed from a heading member 95 supported on the side flange 91 and overlying the record sheet. The lowermost edge 94a of the indicator 94 denotes the writing line of the device. In payroll work, the gauge 92 is adjusted each week to position the sheet 8 so as to align the current week of the year for which an entry is to be made, at the common writing line of the device. The member 95 is arranged to receive an index card 96 bearing appropriate titles corresponding to the columnar arrangement of the forms. This index card serves to assist the operator in making the manual entries in the desired columns of the form. After the sheet 8 is positioned on the head plate 41, the sheet gripper lever 97 may be released so as to prevent accidental or other displacement of the sheet in making entries thereof.

The sheet gripper mechanism comprises a lever 97 pivoted at 98 to a bracket 99 carried by the side flange 91 of the plate 41, Figs. 3 and 10. A starwheel 100 is journaled on a stud 101 carried by one arm of the lever 97. The wheel 100 is held in contact with the sheet under the tension of the spring 102. However, when the lever 97 is rocked about its pivot to the release position shown in dotted lines, Fig. 10, the spring 102 passes over the center of the pivot of the lever and serves to hold the lever in its forward or release position. When the starwheel 100 is in engagement with the sheet at least two points thereof serve to grip the sheet. This increases the efficiency of the gripper so that it firmly holds the sheet in position. A further advantage is that the starwheel may be thrown into engagement with the sheet and assume its holding position without any tendency to buckle or shift the sheet. The latter is due to the fact that the starwheel is free to rotate about its pivot until both engaging points thereof contact the sheet 8 positioned on plate 41.

The head plate 41 is provided with an opening 105 at the writing line of the machine, and in alignment with the writing platen 19. Therefore, any notations made on the record sheet 8 may be transferred to any underlying record sheets by one or more transfer members arranged to pass underneath the plate 41.

As viewed in Figs. 3, 4, and 10, a supply spool 108 of carbon or other transfer material is supported beneath the depending flange 42 of the plate 41 by side plates 106 and 107. The latter plates are suitably secured to the head plate 41 and adapted to removably support the carbon spool 108. A knob 109 controls the releasable holding means for the spool 108, and provides for rewinding the carbon web or taking up any slack in the webs. The supply spool 108 may carry one or more webs of carbon paper adapted to be threaded and advanced through the device. In the present arrangement two webs of carbon 117 and 119 are employed, and arranged to pass over the removable front guide bar 110, under the head plate 41, and then over the rear guide rod 111 to the winding spool 112.

A receiving throat for the third record sheet or envelope such as form 7 is provided underneath the right side of the head plate 41 as viewed in Figs. 1 and 5. This receiving throat permits a form to be inserted between the upper carbon web 117 and the lower carbon web 119. The receiving throat includes a plate 115 having an upturned lip secured to the under side of the head plate 41. An offset flange 116 of the plate 115 extends beneath the longitudinal marginal edge of the upper carbon web 117. A second plate 118 is also carried on the under side of the head plate 41 adjacent but spaced from the plate 115. The plate 118 extends inwardly beyond the longitudinal marginal edge of the second carbon web 119. The plates 115 and 118 also assist in guiding the carbon webs and retain them in spaced relation as they pass from one spool to the other. The receiving throat, including the plates 115 and 118, provides for the ready insertion of a record sheet between a carbon web so that it may be positioned in manifolding relation with the other record forms. A suitable adjustable gauge 120 is provided for positioning the line of entry of sheet 7 at the writing line of the machine, and in relation to the other record sheets.

The rear winding spool 112 is loosely mounted on the shaft 16 but normally operatively connected thereto for rotation by the spool winding mechanism. This connection consists of a latch pawl 122 pivotally mounted on one side flange of the spool 112, Figs. 3 and 4. An offset ear 113 of the pawl 122 is arranged to normally engage the projecting end of a set screw 114 serving to hold the spacing collar 149 rigid with the shaft 16. The engagement of the pawl 122 with the screw head 114 provides a driving connection between spool 112 and shaft 16. In the event it is desired to disconnect the spool 112 from the shaft 16 all that is necessary is to grasp the finger piece 123 of the pawl 122 and rock the pawl so as to disengage the ear 113 from the screw head 114. When the carbon spool 112 is released from the shaft 16 the carbon webs may be rewound on the supply spool 108 by the knob 109.

The winding mechanism for the carbon spool 112 is also operated by the actuating bar 29 moved by the knob 31. Referring to Figs. 3 and 6 of the drawings, a contact plate 125 is adjustably secured to the rear of the bar 29 by a screw 126 passing through the elongated slot formed therein. A ratchet plate 129 loosely mounted on the shaft 16 is normally held in engagement with a spring stud 135 carried on the side frame 11 by the spring 134. The ratchet plate 129 carries a stud 128 extending into the path of an extending ear of the plate 125. Therefore, when the actuator bar 29 is moved rearward, the plate 125 engages the stud 128 and rocks the ratchet plate 129 in a clockwise direction as viewed in Fig. 6. The extent of movement of the ratchet plate 129 depends upon the position to which the plate 125 is adjusted on the bar 129 which in turn determines the extent of advance of the carbon webs. A ratchet dog 130 carried by the plate 129 is held in engagement with the ratchet wheel 131, pinned to the shaft 16, by a spring 132. The dog 130 serves to rotate the shaft 16 a predetermined extent each time the ratchet plate 129 is rocked by the bar 29. A holding pawl 133 prevents any retrograde movement of the ratchet wheel 131 and shaft 16. The rotation of the shaft 16 by the winding mechanism advances a predetermined length of the carbon webs 117 and 119 on the winding spool 112 upon each rearward stroke of the bar 29. By adjusting the plate 125 on the actuating bar 29, the length of feed of the webs of carbon may be increased or diminished according to the requirements of a posting operation or the quality of carbon paper in use.

After the three record sheets have been properly placed in the device as described, the initial step in the operation of the device is to raise the platen 19 before posting an entry. The platen has up to this point been maintained in its lower position in order to provide free access and insertion of the record sheet 7 between the carbon webs. The platen 19 is raised to writing position by shifting the knob 31 forward from its initial normal or intermediate position so as to move the bar 29 from the position shown in Fig. 6 to that shown in Fig. 7. As previously described, the forward movement of the bar 29 through the link 30 and the rocker arm 28 rotates the shaft 25 to move the cams 24 to raise the platen 19. After the platen has been raised the device is prepared for use and the desired entries may be inscribed upon the original or uppermost record 7, and simultaneously transferred to the underlying record sheets 8 and 9.

In completing the posting of a single line of entries, the posted record sheet 8 is removed for the placement of the earning record of the next employee. It is also desired to displace the platen so as to condition the machine for the withdrawal of sheet 7 and for the insertion of a check or envelope for the next employee; to advance sheet 9 for a subsequent posting on the next line of entry; and to advance the carbon webs. With the present construction the latter steps are all accomplished by a single rearward movement of the actuator knob 31. To facilitate the operation of the machine, a stationary knob 31a is mounted on the side frame 11. In the rearward movement of the knob 31, it is convenient for the operator to place the thumb over the knob 31 and the first finger over the stationary knob 31a.

As the bar 29 is moved rearward from its forward position, the platen is first lowered by the action of the link 30 to rock shaft 25. The continued rearward stroke of the bar 29 causes the plate 125 to move the ribbon winding ratchet mechanism to advance the carbon webs, and is also effective to actuate the feed roller mechanism for advancing sheet 9.

After the actuator bar 29 is moved rearward sufficiently to displace the platen 19, the stud 76 carried by the bar 29 engages an ear 71a of the actuator or driver 71 and starts to rock the latter about its axis in a clockwise direction as viewed in Fig. 6. As previously described, the driver 71 is effective through the spring clutch including the spring 72 to rotate the shaft 70 and in turn the feed roll 62. If the rearward stroke of the bar 29 is sufficient, a second stud 77 engages an ear 71b of the actuator 71 so as to positively complete the movement of the actuator 71 in accordance with the predetermined stroke of the bar 29. The length of the stroke of the bar 29 may be varied by the adjusting screw 141 carried by the block 140 supported at the front end of the bar 29. The end of the screw 141 is adapted to engage the front bracket 75 to limit the rearward movement of the bar 29. Therefore, by adjusting the screw 141 the stroke of the bar 29 may be lengthened or shortened to regulate and vary the rotation of the feed rollers 61 and 62. The screw 141 is effective to widely vary the action of the feed rollers so that the step-by-step advance of the record sheet 9 may be regulated to correspond to the spacing of the entry lines thereon.

The actuating bar 29, adapted to engage the actuator 71, is moved rearward against the tension of the spring 78. Therefore, when the knob 31 is released after completing the rearward stroke of the bar 29, the spring 78 serves to return the bar and its operating knob 31 to their normal or intermediate position. In the return movement of the operating mechanism, the actuator 71 under the tension of spring 78 will engage the stop pin 71c carried by the side frame 11. Therefore, the operating bar 29 will come to rest at its intermediate or normal position. The machine is then prepared for the removal of the posted record 7, and the positioning of the next check or envelope stub to be posted.

Figure 2:
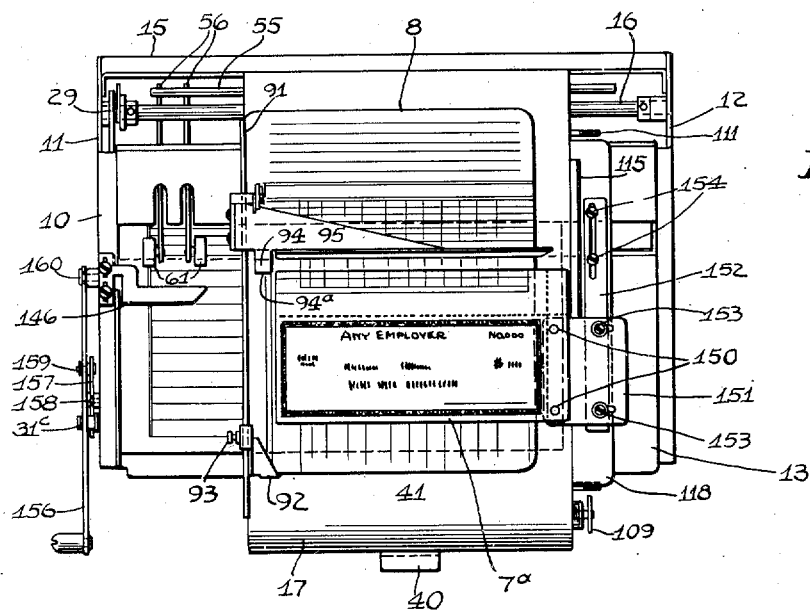
Fig. 2 is a plan view of a modified arrangement of the writing device showing several record sheets positioned on the device in a somewhat different manner for a posting operation.

In certain types of payroll disbursement, some employers find it advantageous to use what is known as a top-stub form of payroll check, generally denoted by the reference numeral 7a. As shown in Fig. 2 of the drawings, such checks are provided with a detachable stub having the voucher panel along the top marginal edge. In the use of a form of this character, it is desirable to position the voucher panel of the stub at the writing line of the machine.

A slightly modified form of the present invention, especially adapted to handle top-stub record sheets is shown in Fig. 2. In this embodiment instead of the end stub of the check or cash envelope being placed in the side receiving throat of the machine, as previously described, the record 7a is positioned over the top of the record sheet 8. A short end stub of the sheet 7a is provided with punched openings adapted to be placed over the locating pins 150. The pins 150 are carried by a plate 151 adjustably secured to a second plate 152 by the screws 153. The plate 152 is adjustably secured to the bed plate 13 of the machine by the screws 154. The adjustable mounted plates 151 and 152 provide for accurately positioning the voucher panel of the stub of the record 7a with relation to the writing line of the machine and the other record sheets.

As the record sheet 9 is advanced by the feed rollers 61 and 62 after each posting operation, the end thereof is deflected downwardly by the plate 66. The sheet is adapted to engage the diverter plate 142, and in its continued advance, the forward end is guided to the front of the posting appliance. After all the entry lines on sheet 9 have been used, the arrangement provides for a readily and accessible manner of removing the payroll record from the machine.

A modified form of actuating means for the bar 29 is shown in Fig. 15 of the drawings. A pin 31c is carried by the bar 29 and projects through an elongated opening 32 of the side frame 11. A lever 157 pivoted at 158 to the frame 11 is formed with a bifurcated end engaging the pin 31c. Another end of the lever 157 is formed with an elongated slot engaged by a stub 159 carried by the operating arm 156 pivoted at 160 to the side frame 11. In this embodiment, a spring 78b tends to retain the bar 29 in its forward position, so that the platen 19 is normally raised to writing position. Therefore, it will be seen that upon the depression of the operating lever 156, the bar 29 is given a complete rearward stroke of operation. This modified embodiment of the invention is especially adapted for use when an assembly of forms, such as shown in Fig. 2, is used with the writing machine. In such case it is not necessary to insert a record sheet into the side throat of the device, and the platen does not have to be normally separated as in the case of the embodiment shown in Fig. 1 of the drawings.

I claim:

1. A writing machine with a common writing line for use in manually posting entries on a plurality of superimposed record sheets having, in combination, a casing having a bed surface for supporting a master record sheet to be successively advanced for the reception of entries at the writing line of the machine, a head plate member mounted on said casing and normally overlying said bed surface for supporting an original record sheet upon which a single line of entries is to be made, said plate member formed with an opening at the writing line of the machine, two webs of carbon transfer material arranged underneath said head plate, means for supporting said webs of transfer material, a pair of spaced plates forming a receiving throat supported along one edge on the under side of said head plate, said spaced plates having one edge arranged to enter between and to overlap one longitudinal marginal edge of said transfer webs, said receiving throat plates being adapted to guide a third record sheet between said transfer webs and between said original and master record sheets for the reception of a single line of entries thereon, whereby any inscription made on said original record will be transferred to said third and said master record sheets.

2. A writing machine with a common writing line for use in posting entries on a plurality of superimposed record sheets having, in combination, a casing having a surface for supporting a master record sheet upon which entries are to be transferred, a head unit pivotally connected to said casing and adapted to support one or more record sheets and carbon transfer members in manifolding relation, said head unit having an opening at the writing line of the machine so that writings made on the topmost record sheet may be transferred to the underlying record sheets, said head unit normally overlying and resting adjacent said casing but adapted to be raised so as to be spaced away from said casing, selectively operable feed mechanism supported by said casing adapted to hold and advance said master record sheet step-by-step over said casing surface, and means operable upon the raising of said head unit to render said feed mechanism ineffective to hold and advance said master record sheet.

3. A writing machine of the character described having, in combination, a casing provided with a surface upon which a master record sheet is positioned and advanced for the reception of successive lines of transferred entries, a head unit pivotally connected to said casing and adapted to support one or more original and other record sheets in manifolding relation, said head unit having an opening at the writing line of the machine so that the writings made on the uppermost record sheet may be transferred to the underlying sheets, said head unit normally overlying and resting adjacent said casing surface but adapted to be moved about its pivot and raised away from said surface to permit the positioning of said master sheet, feed roll mechanism for holding and advancing said master record step-by-step over said casing surface, comprising: a feed roller arm pivotally mounted on said casing, a driven feed roller supported adjacent said surface by said casing, a pressure feed roller normally in cooperative engagement with said driven roller and journaled on said roller arm above said surface, and selectively operable actuating means for said driven roller; said head unit having a part adapted when the unit is moved about its pivot to engage said feed roll arm so as to move said pressure roller out of engagement with said driven roller upon the raising of said head unit.

4. A writing machine with a common writing line for posting entries on a plurality of superimposed record sheets having, in combination, a casing having a bed surface formed with an opening at the writing line and adapted to receive a master record sheet upon which successive entries are to be transferred, a head unit formed with an opening at the writing line and mounted on said casing to overlie said bed surface for receiving one or more original and other record sheets, transfer material arranged in manifolding relation with said record sheets, means to support said transfer material for advancement underneath said head unit, a shiftable plate member mounted in said casing, said plate member being adapted to be shifted to and from a position effective to support said superimposed record sheets and said transfer material in close proximity at the writing line to facilitate the entry of legible inscriptions on the sheets, selectively operable means for shifting said plate member to effective position to support said record sheets and to shift the plate member from said effective position so as to permit free removal and insertion of the record sheets in said head unit and advance of the transfer material, and means for advancing said transfer material.

5. A writing machine with a common writing line for use in posting entries on a plurality of superimposed record sheets having, in combination, a casing having a bed surface formed with an opening at the writing line and for supporting a master record sheet upon which successive lines of entries are to be posted, a movable head unit mounted on said casing to overlie said bed surface and adapted to receive one or more record data sheets upon which a single line of entries is to be posted, said head unit formed with an opening at the writing line of the machine, transfer material arranged in manifolding relation with said record sheets and adapted to be advanced along the under side of said head unit, means for supporting said transfer material, a shiftable writing platen mounted in said casing and adapted to form a writing surface at the writing line of the machine, said platen adapted to be shifted to and from a position effective to support said superposed record sheets and transfer material in close proximity at the writing line, means for advancing said master record sheet step-by-step to receive successive entries thereon, and a common actuating means for shifting said platen and for operating said sheet advancing means.

6. A writing machine with a common writing line for use in normally posting entries on a plurality of superimposed record sheets having, in combination, a casing having a bed surface formed with an opening at the writing line and for supporting a master record sheet upon which successive lines of entries are to be transferred, a movable head unit mounted on said casing to normally overlie said bed surface and adapted to support one or more record sheets positioned thereon for the reception of a single line of entries, said head unit formed with an opening at the writing line of the machine, webs of transfer material arranged to advance along the under side thereon in manifolding relation with said record sheets, means for supporting said transfer webs, a shiftable writing platen mounted in said casing to provide a writing surface at the writing line of the machine, said platen adapted to be shifted to and from a position effective to support said record sheets and transfer material in close proximity at the writing line, means for advancing said master record sheet step-by-step to position successive entry lines at the writing line, means for shifting said platen to and from said effective position, means for advancing said transfer webs so as to renew the material at the writing line, and a common selectively operable actuator for said master sheet advancing means, said platen shifting means, and said transfer advancing means.

7. A writing machine with a single writing line for use in manually posting entries on a plurality of sheets positioned thereon in superimposed relation having, in combination, a casing with a supporting surface upon which a master record sheet is positioned and advanced to receive successive lines of entries transferred thereon, a movable head unit mounted on said casing normally overhanging said casing surface, said head unit formed with an opening at the writing line and arranged to receive one or more record sheets positioned thereon at the writing line for the reception of a single line of entries, carbon transfer webs arranged to advance along the under side of the unit in manifolding relation with said record sheets, means for supporting said transfer webs, means for advancing said transfer webs so as to renew the transfer material at the writing line, feed roller means mounted in said casing and adapted to be actuated to advance said master record sheet step-by-step to position successive entry lines at the writing line of the machine, a selectively operable actuator having an operating stroke to actutae said transfer web advancing means and said feed roller means, and means for adjusting the stroke of said actuator so as to increase or reduce the advance of said master record with relation to the writing line by said feed roller means.

8. A writing machine with a single writing line for use in manually posting entries on a plurality of individual sheets positioned thereon in manifolding relation having, in combination, a casing with a supporting surface upon which a master record sheet is positioned and advanced to receive successive lines of entries transferred thereon, a movable head unit formed with an opening at the writing line and mounted on said casing normally overhanging said casing surface, said head unit arranged to receive one or more record sheets positioned thereon at the writing line for a single line of entries, a pair of spools being adapted to carry one or more webs of carbon transfer material arranged to advance along the under side of said unit in manifolding relation with said record sheets, one of said spools removably supported by said head unit and the other removably supported in said casing, feed roller means mounted in said casing and adapted to be actuated to advance said master record sheet step-by-step to position different entry portions thereof at the writing line of the machine, means for rotating one of said spools to advance said transfer webs over the writing line, a selectively operable actuating means for said feed roller means and said spool advancing means having a normally constant operating stroke, and adjustable means associated with said actuator to increase or reduce the feeding action of said transfer web advancing means when operated by said actuating means.

9. A writing machine with a single writing line for use in manually posting entries on a plurality of record sheets positioned thereon in manifolding relation having, in combination, a casing with a supporting surface formed with an opening at the writing line and upon which a master record sheet is positioned and advanced to receive successive lines of entries transferred thereon, a head unit formed with an opening at the writing line and mounted on said casing overhanging said casing surface, said head unit arranged to receive one or more data record sheets positioned thereon at the writing line for the reception of a single line of entries, carbon transfer webs arranged to advance along the underside of said unit in manifolding relation with said record sheets, means for supporting said transfer webs, means for advancing said transfer webs so as to renew the transfer material at the writing line, a writing platen mounted in said casing and adapted to be shifted from an ineffective position to a position effective to provide a writing surface and to support said record sheets and transfer material in close proximity at the writing line of the machine, means for shifting said platen from ineffective position to the effective writing positon, feed roller means mounted in said casing for advancing said master record sheet step-by-step to position successive entry portions at the writing line, and a selectively operable actuator having an operating stroke in one direction to actuate said shifting means to move said platen to effective position and an operating stroke in the opposite direction to actuate said carbon advancing means and said feed roller means.

10. A writing machine with a common writing line for use in posting entries on a plurality of sheets arranged in manifolding relation having, in combination, a casing provided with a bed surface having an opening at the writing line and adapted to support a master record sheet upon which successive lines of entries are to be posted, a movable head unit mounted on said casing and adapted to support one or more record data sheets upon which a single line of entries is to be posted, said head unit formed with an opening at the writing line of the machine, transfer material arranged to be advanced in manifolding relation with said record sheets, means for supporting said transfer material, a shiftable yoke member pivoted to the bottom of said bed surface, said yoke having a flat portion substantially parallel to the plane of said surface and adapted to be moved to and from writing position through the opening in said surface, a rock shaft supported by said casing, cam means on said rock shaft for shifting the flat portion of said yoke member to writing position, means for feeding said master record to position successive entry portions at the writing line, means for advancing said transfer material, and a manual actuating means for said record feed means and said transfer advncing means, said actuating means adapted when moved in one direction to rock said shaft to move said yoke portion to writing position and adapted when moved in the opposite direction to rock said shaft to move said yoke portion from writing position.

11. In a posting machine with a common writing line adapted for use in manually entering items on superimposed record sheets having, in combination, a bed surface for supporting a master record sheet adapted to be intermittently advanced to receive successive lines of entries thereon at the writing line of the machine, selectively operable means supported in said casing for holding and advancing said master sheet between each posting operation, a displaceable head unit shiftably mounted on said casing and normally overlying said bed surface, said head unit formed with an opening at the writing line, said unit being adapted to receive and support other record sheets for the reception of a single line of entries at the writing line of the machine, transfer means interposed between the record sheets, means for supporting said transfer means, said head unit shiftable on said casing for lateral adjustment with respect to said bed surface so as to vary the position of said other record sheets with respect to said master sheet, and releasable means for retaining said head unit in an adjusted position.

12. A writing machine having a common posting line adapted for use in manually entering items on a plurality of sheets positioned thereon in superimposed relation having, in combination, a casing with a work receiving surface formed with an opening at the posting line and upon which a master sheet is positioned and advanced to receive successive lines of entries transferred thereon, a platen supported in said casing at the posting line, a displaceable head unit mounted on said casing and normally overlying said work surface, said head unit formed with an opening at the posting line and arranged to receive one or more independent record sheets positioned thereon at the posting line for the reception of a single line of entries, transfer means interposed between the record sheets, means for supporting said transfer means, feed means mounted in said casing and adapted to be intermittently actuated to advance said master record sheet step-by-step to position successive lines of entries at the posting line between posting operations, selectively movable bar having a normally uniform operating stroke for actuating said feed means, and means for adjusting the stroke of said bar so as to increase or reduce the advance of said master sheet relative to the posting line by said feed means.

13. A writing machine with a common posting line for use in manually entering items on a plurality of record sheets positioned thereon in superimposed relation having, in combination, a casing with a work receiving surface upon which a master record sheet is positioned and advanced to receive successive lines of entries transferred thereon, a displaceable head unit shiftably mounted on said casing and normally overlying said work surface, said head unit formed with an opening at the posting line and being adapted to receive one or more record sheets positioned thereon for the reception of a single line of entries at the posting line, carbon transfer webs arranged to advance in manifolding relation with the record sheets, means for supporting said transfer webs, so as to renew the transfer material at the posting line, feed means carried by said casing and adapted to be actuated to advance said master record sheet step-by-step to position successive entry lines at the posting line of the machine, selectively operable actuator having a normally uniform operating stroke to actuate said transfer web advancing means and said feed means, means for adjusting the stroke of said actuator so as to increase or reduce the advance of said master sheet with relation to the posting line by said feed means, and independent adjusting means associated with said actuator to increase or reduce the movement of said transfer webs by said advancing means upon the movement of said actuator.

14. A writing machine with a common posting line for use in manually entering items upon superimposed record sheets having, in combination, a casing provided with a surface for supporting a master record sheet, intermittently actuated feed means for holding and advancing the master sheet with relation to said posting line, selective means for actuating said feed means, a displaceable head shiftably mounted on said casing and normally overlying said surface, said head member formed with an opening at the posting line and being adapted to receive and support an original record sheet, transfer means interposed between the record sheet, means for supporting said transfer means, a selectively operable lever pivotally supported on said head member, a rotatable gripper member pivoted to said lever and being adapted to be moved into engagement with said original record sheet to prevent displacement thereof in the use of the machine, said gripper member having projections widely spaced about its periphery for engagement with the original record sheet, and spring means for said lever, said gripper member being adapted to rotate freely on said lever so that any two adjacent projections are self-adjusted upon coming into contact with the sheet, whereby the pressure applied thereto by said lever through said spring is equalized; the arrangement being such that when one projection of the gripper member is brought into contact with the sheet ahead of the other, the gripper member is adapted to rotate without any tendency to displace said original record sheet with relation to said master record and the posting line of the machine, but when two of said projections engage the sheet it is held under the tension of said spring.

15. A writing machine with a single writing line for use in manually posting entries on a plurality of individual sheets positioned thereon in manifolding relation having, in combination, a casing having a bed surface to receive a master record sheet upon which entries are to be transferred, a cross shaft having its ends mounted in said casing, a shiftable head unit formed with an opening at the writing line and being pivotally supported at one end on said cross shaft, said head unit normally overlying said bed surface to receive other record sheets for the reception of entries at the writing line of the machine, carbon transfer material arranged to advance in manifolding relation with said record sheets, a supply spool and a winding spool for said transfer material, said supply spool removably supported at the free end of said head unit opposite that supported on said shaft, said winding spool carried by said cross shaft, releasable means for connecting said winding spool to said shaft, and selectively operable means for rotating said shaft to wind said transfer material from said supply spool to said winding spool in order to renew the carbon transfer at said writing line of the machine, the arrnagement being such that the free end of said head unit carrying said supply spool may be raised and displaced from said bed surface in order to permit a master record sheet to be positioned on said bed surface.

WILLIAM UHL.